US011776554B2

(12) United States Patent
Disch et al.

(10) Patent No.: US 11,776,554 B2
(45) Date of Patent: Oct. 3, 2023

(54) AUDIO PROCESSOR AND METHOD FOR GENERATING A FREQUENCY ENHANCED AUDIO SIGNAL USING PULSE PROCESSING

(71) Applicant: Fraunhofer-Gesellschaft zur Förderung der angewandten Forschung e.V., Munich (DE)

(72) Inventors: Sascha Disch, Erlangen (DE); Michael Sturm, Erlangen (DE)

(73) Assignee: FRAUNHOFER-GESELLSCHAFT ZUR FÖRDERUNG DER ANGEWANDTEN FORSCHUNG E.V., Munich (DE)

(*) Notice: Subject to any disclaimer, the term of this patent is extended or adjusted under 35 U.S.C. 154(b) by 173 days.

(21) Appl. No.: 17/332,283

(22) Filed: May 27, 2021

(65) Prior Publication Data

US 2021/0287687 A1 Sep. 16, 2021

Related U.S. Application Data

(63) Continuation of application No. PCT/EP2019/084974, filed on Dec. 12, 2019.

(30) Foreign Application Priority Data

Dec. 21, 2018 (EP) .................................. 18215691
Apr. 1, 2019 (EP) .................................. 19166643

(51) Int. Cl.
*G10L 19/02* (2013.01)
*G10L 19/08* (2013.01)
*G06F 3/16* (2006.01)

(52) U.S. Cl.
CPC .......... *G10L 19/0208* (2013.01); *G10L 19/08* (2013.01); *G06F 3/162* (2013.01)

(58) Field of Classification Search
CPC ...... G10L 19/0208; G10L 19/08; G06F 3/162
See application file for complete search history.

(56) References Cited

U.S. PATENT DOCUMENTS 8,954,179 B2 2/2015 Yokoyama
9,264,003 B2 2/2016 Disch
(Continued)

FOREIGN PATENT DOCUMENTS

AU 2009210303 B2 11/2011
CN 1965352 A 5/2007
(Continued)

OTHER PUBLICATIONS

Notice of Acceptance dated Jan. 13, 2023, issued in application No. AU 2019409071.
(Continued)

*Primary Examiner* — Bhavesh M Mehta
*Assistant Examiner* — Nandini Subramani
(74) *Attorney, Agent, or Firm* — McClure, Qualey & Rodack, LLP

(57) ABSTRACT

An audio processor for generating a frequency enhanced audio signal from a source audio signal has: an envelope determiner for determining a temporal envelope of at least a portion of the source audio signal; an analyzer for analyzing the temporal envelope to determine temporal values of certain features of the temporal envelope; a signal synthesizer for generating a synthesis signal, the generating having placing pulses in relation to the determined temporal values, wherein the pulses are weighted using weights derived from amplitudes of the temporal envelope related to the temporal values, where the pulses are placed; and a combiner for combining at least a band of the synthesis signal that is not included in the source audio signal and the source audio signal to obtain the frequency enhanced audio signal.

19 Claims, 14 Drawing Sheets

(56) References Cited

U.S. PATENT DOCUMENTS

| | | | |
|---|---|---|---|
| 2004/0078194 A1 | 4/2004 | Liljeryd et al. | |
| 2008/0027711 A1 | 1/2008 | Rajendran et al. | |
| 2008/0312915 A1 | 12/2008 | Den Brinker et al. | |
| 2009/0107322 A1 | 4/2009 | Akiyama | |
| 2009/0274309 A1 | 11/2009 | Pedersen | |
| 2011/0054885 A1* | 3/2011 | Nagel | G10L 21/038 704/203 |
| 2011/0099018 A1* | 4/2011 | Neuendorf | G10L 21/038 704/500 |
| 2011/0255714 A1 | 10/2011 | Neusinger et al. | |
| 2011/0286601 A1 | 11/2011 | Fukui et al. | |
| 2015/0332707 A1* | 11/2015 | Disch | G10L 21/0388 704/205 |
| 2016/0240200 A1* | 8/2016 | Disch | G10L 19/028 |
| 2017/0069332 A1* | 3/2017 | Disch | G10L 19/0204 |

FOREIGN PATENT DOCUMENTS

| | | |
|---|---|---|
| CN | 101642399 A | 2/2010 |
| JP | H08305396 A | 11/1996 |
| JP | 2001521648 A | 11/2001 |
| JP | 2009104015 A | 5/2009 |
| JP | 2016541012 A | 12/2016 |
| RU | 2 421 936 C2 | 6/2011 |
| RU | 2 550 525 C2 | 5/2015 |
| TW | 200830278 A | 7/2008 |

OTHER PUBLICATIONS

Russian language office action dated Apr. 14, 2022, issued in application No. RU 2021117876.

English language translation Russian office action dated Apr. 14, 2022, issued in application No. RU 2021117876 (pp. 1-4 of attachment).

Indian office action dated Mar. 21, 2022, issued in application No. IN 202137025061.

International Search Report and Written Opinion dated Jan. 28, 2020, issued in application No. PCT/EP2019/084974.

Dietz, M., et al.; "Spectral Band Replication, a Novel Approach in Audio Coding;" Audio Engineering Society Convention 112; May 2002; pp. 1-8.

Disch, S., et al.; "Intelligent Gap Filling in Perceptual Transform Coding of Audio;" Audio Engineering Society Convention 141; Sep. 2016; pp. 1-9.

Laitinen, M.V., et al.; "Phase derivative correction of bandwidth extended signals for perceptual audio codecs;" 140th Audio Engineering Society International Convention 2016, AES 2016. Audio Engineering Society; Jun. 2016; pp. 1-8.

Atti, V., et al.; "Super-wideband bandwidth extension for speech in the 3GPP EVS codec;" 2015 IEEE International 15 Conference on Acoustics, Speech and Signal Processing (ICASSP); 2015; pp. 5927-5931.

He, L., et al.' "A Praat-Based Algorithm to Extract the Amplitude Envelope and Temporal Fine Structure Using the Hilbert Transform;" INTERSPEECH 2016-1447; pp. 530-534.

Jarne, C.; "Simple empirical algorithm to obtain signal envelope in the three steps;" Mar. 2017; pp. 1-9.

JP Office Action dated Aug. 29, 2022, issued in application No. 2021-536022.

English translation of JP Office Action dated Aug. 29, 2022, issued in application No. 2021-536022.

* cited by examiner

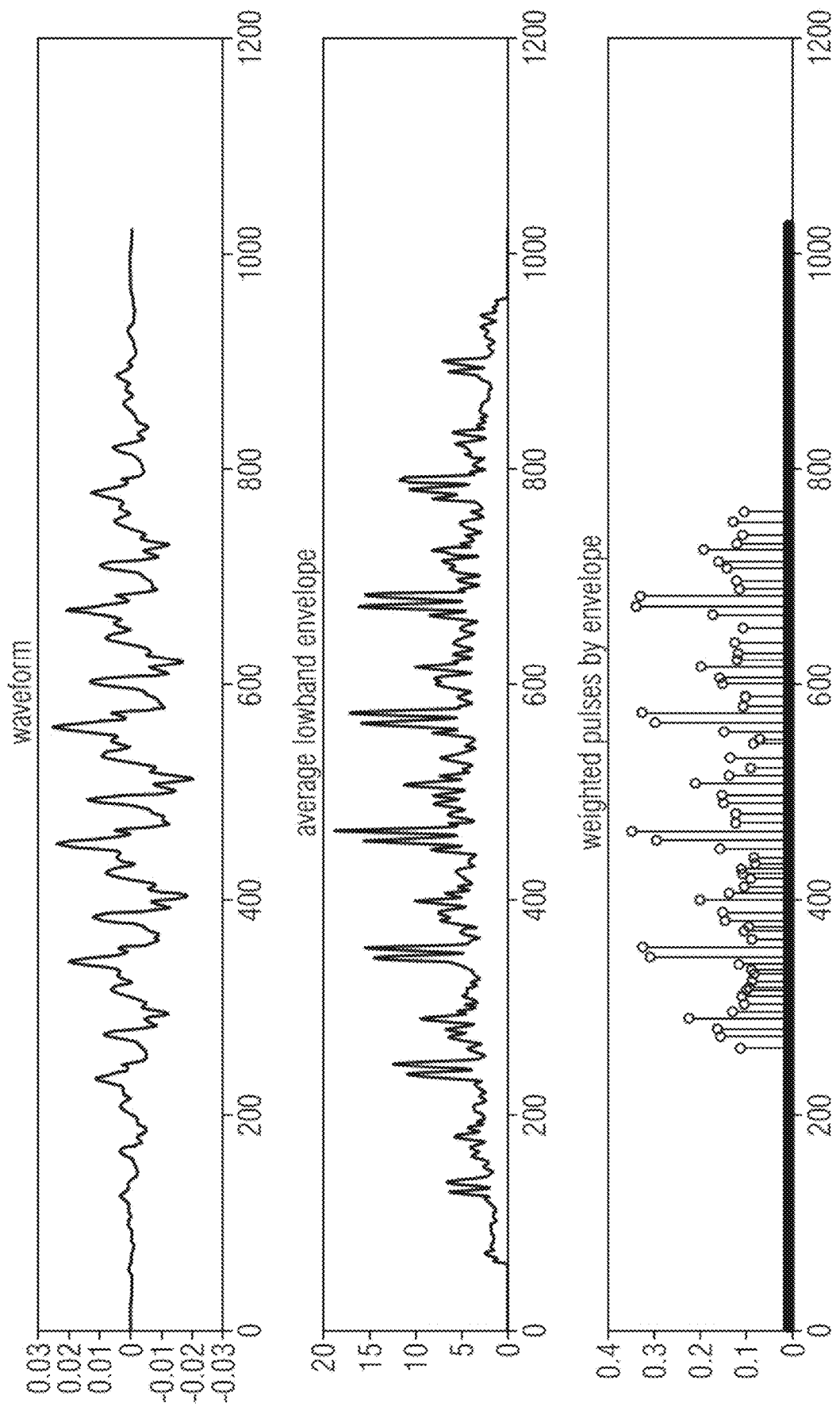

AUDIO PROCESSOR AND METHOD FOR GENERATING A FREQUENCY ENHANCED AUDIO SIGNAL USING PULSE PROCESSING

CROSS-REFERENCE TO RELATED APPLICATIONS

This application is a continuation of copending International Application No. PCT/EP2019/084974, filed Dec. 12, 2019, which is incorporated herein by reference in its entirety, and additionally claims priority from European Application No. 18215691.9, filed Dec. 21, 2018, and from European Application No. 19166643.7, filed Apr. 1, 2019, which are also incorporated herein by reference in their entireties.

BACKGROUND OF THE INVENTION

The present invention is related to audio signal processing and, particularly, to concepts for generating a frequency enhanced audio signal from a source audio signal.

Storage or transmission of audio signals is often subject to strict bitrate constraints. In the past, coders were forced to drastically reduce the transmitted audio bandwidth when only a very low bitrate was available. Modem audio codecs are nowadays able to code wide-band signals by using bandwidth extension (BWE) methods [1-2].

These algorithms rely on a parametric representation of the high-frequency content (HF), which is generated from the waveform coded low-frequency part (LF) of the decoded signal by means of transposition into the HF spectral region ("patching"). In doing so, first a "raw" patch is generated, and second, parameter driven post-processing is applied on the "raw" patch.

Typically, said post-processing is applied to adjust important perceptual properties that have not been regarded during high-frequency generation through transposition and thus need to be adjusted on the resulting "raw" patch a-posteriori.

However, if e.g. the spectral fine structure in a patch copied to some target region is vastly different from the spectral fine structure of the original content, undesired artefacts might result and degrade the perceptual quality of the decoded audio signal. Often, in these cases, the applied post-processing has not been able to fully correct the wrong properties of the "raw" patch.

It is the object of the invention to improve perceptual quality through a novel signal adaptive generation of the gap-filling or estimated high-frequency signal "raw" patch content, which is perceptually adapted to the LF signal.

By already obtaining a perceptually adapted "raw" signal, otherwise necessary a-posteriori correction measures are minimized. Moreover, a perceptually adapted raw signal might allow for the choice of a lower cross-over frequency between LF and HF than traditional approaches [3].

In BWE schemes, the reconstruction of the HF spectral region above a given so-called cross-over frequency is often based on spectral patching. Typically, the HF region is composed of multiple stacked patches and each of these patches is sourced from band-pass (BP) regions of the LF spectrum below the given cross-over frequency.

State-of-the-art systems efficiently perform the patching within a filter bank or time-frequency-transform representation by copying a set of adjacent subband coefficients from a source spectral to the target spectral region.

In a next step, tonality, noisiness and the spectral envelope is adjusted such that it closely resembles the perceptual properties and the envelope of the original HF signal that have been measured in the encoder and transmitted in the bit stream as BWE side information.

Spectral Band Replication (SBR) is a well-known BWE employed in contemporary audio codecs like High Efficiency Advanced Audio Coding (HE-AAC) and uses the above outlined techniques [1].

Intelligent Gap Filling (IGF) denotes a semi-parametric coding technique within modern codecs like MPEG-H 3D Audio or the 3gpp EVS codec [2]. IGF can be applied to fill spectral holes introduced by the quantization process in the encoder due to low-bitrate constraints.

Typically, if the limited bit budget does not allow for transparent coding, spectral holes emerge in the high-frequency (HF) region of the signal first and increasingly affect the entire upper spectral range for lowest bitrates.

At the decoder side, such spectral holes are substituted via IGF using synthetic HF content generated in a semi-parametric fashion out of low-frequency (LF) content, and post-processing controlled by additional parametric side information like spectral envelope adjustment and a spectral "whitening level".

However, after said post-processing still a remaining mismatch can exist that might lead to the perception of artefacts. Such a mismatch can typically consist of
- Harmonic mismatch: beating artefacts due to misplaced harmonic components
- Phase mismatch: dispersion of pulse-like excitation signals leading to a perceived loss in buzziness in voiced speech or brass signals
- Tonality mismatch: exaggerated or too little tonality Therefore, frequency and phase correction methods have been proposed to correct these types of mismatch [3] through additional post-processing. In the present invention, we propose to already avoid introducing these artefacts in the "raw" signal, rather than fixing them in a post-processing step like found in state-of-art-methods.

Other implementations of BWE are based on time domain techniques for estimating the HF signal [4], typically through application of a non-linear function on the time domain LF waveform like rectification, squaring or a power function. This way, by distorting the LF, a rich mixture of consonant and dissonant overtones are generated that can be used as a "raw" signal to restore the HF content.

Here, especially the harmonic mismatch is a problem, since, on polyphonic content, these techniques produce a dense mixture of desired harmonic overtones inevitably mixed with undesired inharmonic components.

Whereas post-processing might easily increase noisiness, it utterly fails in removing unwanted inharmonic tonal components once they are introduced in the "raw" estimated HF.

SUMMARY

According to an embodiment, an audio processor for generating a frequency enhanced audio signal from a source audio signal may have: an envelope determiner for determining a temporal envelope of at least a portion of the source audio signal; an analyzer for analyzing the temporal envelope to determine values of certain features of the temporal envelope; a signal synthesizer for generating a synthesis signal, the generating having placing pulses in relation to the determined temporal values, wherein the pulses are weighted using weights derived from amplitudes of the temporal envelope related to the temporal values, where the pulses are placed; and a combiner for combining at least a band of the synthesis signal that is not included in the source audio signal and the source audio signal to obtain the frequency enhanced audio signal.

According to another embodiment, a method of generating a frequency enhanced audio signal from a source audio signal may have the steps of: determining a temporal envelope of at least a portion of the source audio signal; analyzing the temporal envelope to determine temporal values of certain features of the temporal envelope; placing pulses in relation to the determined temporal values in a synthesis signal, wherein, in the synthesis signal, the placed pulses are weighted using weights derived from amplitudes of the temporal envelope related to the temporal values, where the pulses are placed; and combining at least a band of the synthesis signal that is not included in the source audio signal and the source audio signal to obtain the frequency enhanced audio signal.

Still another embodiment may have a non-transitory digital storage medium having stored thereon a computer program for performing a method of generating a frequency enhanced audio signal from a source audio signal having the steps of: determining a temporal envelope of at least a portion of the source audio signal; analyzing the temporal envelope to determine temporal values of certain features of the temporal envelope; placing pulses in relation to the determined temporal values in a synthesis signal, wherein, in the synthesis signal, the placed pulses are weighted using weights derived from amplitudes of the temporal envelope related to the temporal values, where the pulses are placed; and combining at least a band of the synthesis signal that is not included in the source audio signal and the source audio signal to obtain the frequency enhanced audio signal, when said computer program is run by a computer.

The present invention is based on the finding that an improved perceptual quality of audio bandwidth extension or gap filling or, generally, frequency enhancement is obtained by a novel signal adaptive generation of the gap filling or estimated high-frequency (HF) signal "raw" patch content. By obtaining a perceptually adapted "raw" signal, otherwise necessary a-posteriori correction measures can be minimized or even eliminated.

Embodiments of the present invention indicated as Waveform Envelope Synchronized Pulse Excitation (WESPE) is based on the generation of a pulse train-like signal in a time domain, wherein the actual pulse placement is synchronized to a time domain envelope. The latter is derived from the low-frequency (LF) signal that is available at the output of a, for example, core coder or that is available from any other source of a source audio signal. Thus, a perceptually adapted "raw" signal is obtained.

An audio processor in accordance with an aspect of the invention is configured for generating the frequency-enhanced audio from the source audio signal and comprises an envelope determiner for determining a temporal envelope of at least a portion of the source audio signal. An analyzer is configured for analyzing the temporal envelope to determine values of certain features of the temporal envelope. These values can be temporal values or energies or other values related to the features. A signal synthesizer is located for generating a synthesis signal, where the generation of the synthesis signal comprises placing pulses in relation to the determined temporal values, where the pulses are weighted using weights derived from amplitudes of the temporal envelope, where the amplitudes are related to the temporal values, where the pulses are placed. A combiner is there for combining at least a band of the synthesis signal that is not included in the source audio signal and the source audio signal to obtain the frequency enhanced audio signal.

The present invention is advantageous in that, in contrast to somewhat "blind" generation of higher frequencies from the source audio signal, for example by using a nonlinear processing or so, the present invention provides a readily controlled procedure by determining the temporal envelope of the source signal and by placing pulses at certain features of the temporal envelope such as local maxima of the temporal envelope or local minima of the temporal envelope or by placing pulses always between two local minima of the temporal envelope or in any other relation with respect to the certain features of the temporal envelope. A pulse has a frequency content that is, in general, flat over the whole frequency range under consideration. Thus, even when pulses are used that are not theoretically ideal but e.g. close to that, the frequency content of such non-ideal pulses, i.e., pulses that are not in line with the ideal Dirac shape, is nevertheless relatively flat in the interesting frequency range, for example between 0 and 20 kHz in the context of IGF (intelligent gap filling) or in the frequency range between, for example, 8 kHz to 16 kHz or 20 kHz in the context of audio bandwidth extension, where the source signal is bandwidth limited.

Thus, the synthesis signal that consists of such pulses provides a dense and readily controlled high frequency content. By placing several pulses per temporal envelope that, of example, is extracted from a frame of the source audio signal, shaping in the spectral domain is obtained, since the frequency contents of the different pulses placed with respect to the certain features superpose each other in the spectral domain in order to match at least the dominant features or, generally, the certain features of the temporal envelope of the source audio signal. Due to the fact that the phases of the spectral values represented by pulses are locked to each other, and due to the fact that, advantageously, either positive pulses or negative pulses are placed by the signal synthesizer, the phases of the spectral values represented by an individual pulse among the different pulses are locked to each other. Therefore, a controlled synthesis signal having very useful frequency domain characteristics is obtained. Typically, the synthesis signal is a broadband signal extending over the whole existing audio frequency range, i.e., also extending into the LF range. In order to actually generate the final signal that is eventually combined with the source audio signal for the purpose of frequency enhancement, at least a band of the synthesis signal, such as the high band or a signal determined by a band-pass is extracted and added to the source audio signal.

The inventive concept has the potential to be performed fully in the time domain, i.e., without any specific transform. The time domain is either the typical time domain or the linear prediction coding (LPC) filtered time domain, i.e., a time domain signal that has been spectrally whitened and needs to finally be processed using an LPC synthesis filter to re-introduce the original spectral shape in order to be useful for audio signal rendering. Thus, the envelope determination, the analysis, the signal synthesis, the extraction of the synthesis signal band and the final combination can all be performed in the time domain so that any typically delay-incurring time-spectral transforms or spectral-time transforms can be avoided. However, the inventive context is also flexible in that several procedures such as envelope determination, signal synthesis and the combination can also be performed partly or fully in the spectral domain. Thus, the implementation of the present invention, i.e., whether certain procedures used by the invention are implemented in the time or spectral domain can always be fully adapted to the corresponding framework of a typical decoder design used for a certain application. The inventive context is even flexible in the context of an LPC speech coder where, for example, a frequency enhancement of an LPC excitation signal (e.g. a TCX signal) is performed. The combination of the synthesis signal and the source audio signal is performed in the LPC time domain and the final conversion from the LPC time domain into the normal time domain is performed with an LPC synthesis filter where, specifically, a typically advantageous envelope adjustment of the synthesis signal is performed within the LPC synthesis filter stage for the corresponding spectral portion represented by the at least one band of the synthesis signal. Thus, typically necessary post processing operations are combined with envelope adjustment within a single filter stage. Such post processing operations may involve LPC synthesis filtering, deemphasis filtering known from speech decoders, other post filtering operations such as bass post filtering operations or other sound enhancement post filtering procedures based on LTP (Long Term Prediction) as found in TCX decoders or other decoders.

BRIEF DESCRIPTION OF THE DRAWINGS

Embodiments of the present invention are subsequently discussed with respect to the accompanying drawings, in which:

FIG. 10a illustrates several signals in the process of frequency enhancement with respect to a sound item "pitch pipe";

DETAILED DESCRIPTION OF THE INVENTION

Figure 1:
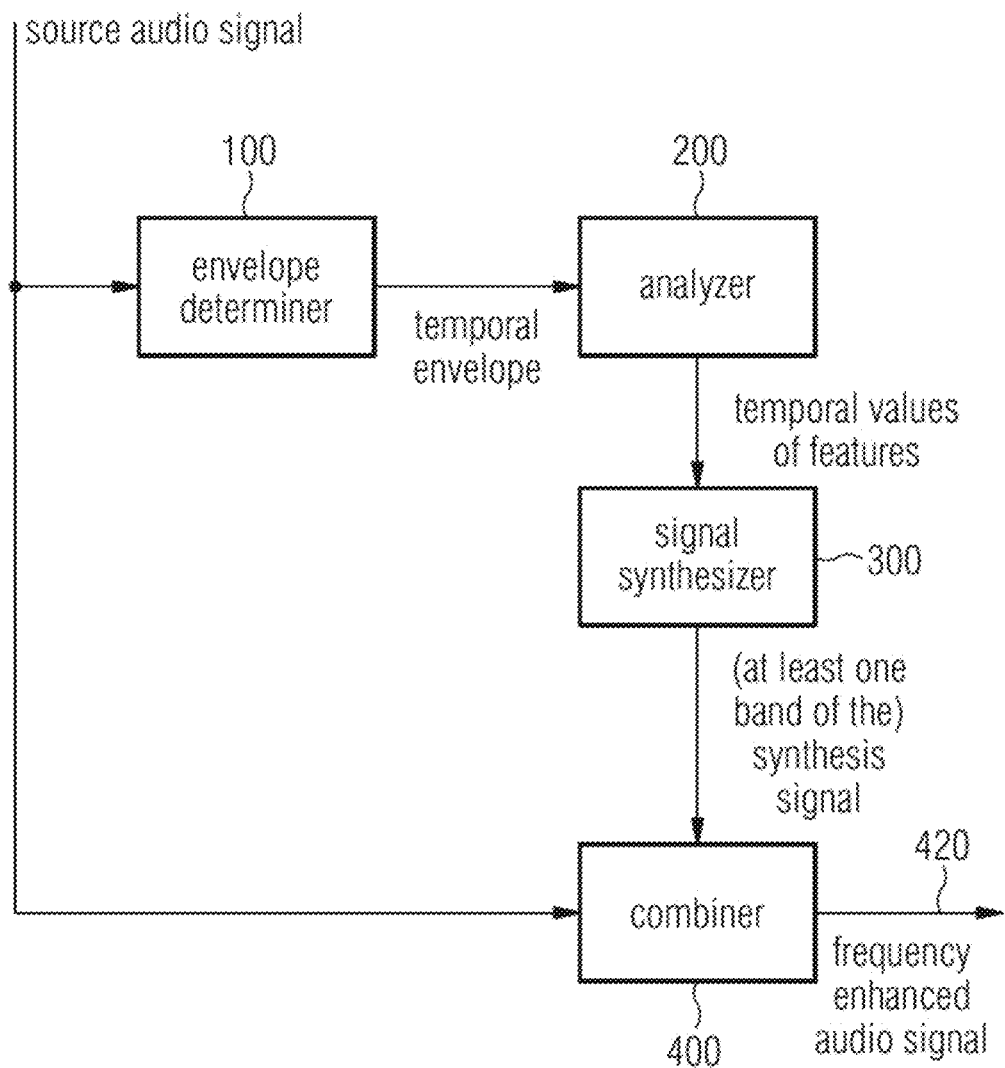
FIG. 1 is a block diagram of an embodiment of an audio processor in accordance with the present invention.

FIG. 1 illustrates an audio processor for generating a frequency enhanced audio signal 420 at the output of a combiner 400 from a source audio signal input into an envelope determiner 100 on the one hand and the input into the combiner 400 on the other hand.

The envelope determiner 100 is configured for determining a temporal envelope of at least a portion of the source audio signal. The envelope determiner can use either the full-band source audio signal or, for example only a band or portion of the source audio signal that has a certain lower border frequency such as a frequency of, for example, 100, 200 or 500 Hz. The temporal envelope is forwarded from the envelope determiner 100 to an analyzer 200 for analyzing the temporal envelope to determine values of certain features of the temporal envelope. These values can be temporal values or energies or other values related to the features. The certain features can, for example, be local maxima of the temporal envelope, local minima of the temporal envelope, zero-crossings of the temporal envelope or points between two local minima or points between two local maxima where, for example, the points between such features are values that have the same temporal distance to the neighboring features. Thus, such certain features can also be points that are midway between two local minima or two local maxima. However, in embodiments, the determination of local maxima of the temporal envelope using, for example, a curve calculus processing is of advantage. The temporal values of the certain features of the temporal envelope are forwarded to a signal synthesizer 300 for generating a synthesis signal. The generation of the synthesis signal comprises placing pulses in relation to the determined temporal envelopes, where the pulses are weighted, either before placement or after being placed using weights derived from amplitudes of the temporal envelope, the amplitudes being related to the temporal values received from the analyzer or related to the temporal values, where the pulses are placed.

At least one band of the synthesis signal or the full high band of the synthesis signal or several individual and distinct bands of the synthesis signal or even the whole synthesis signal are forwarded to the combiner 400 for combining at least a band of the synthesis signal that is not included in the source audio signal and the source audio signal to obtain the frequency enhanced audio signal.

Figure 2:
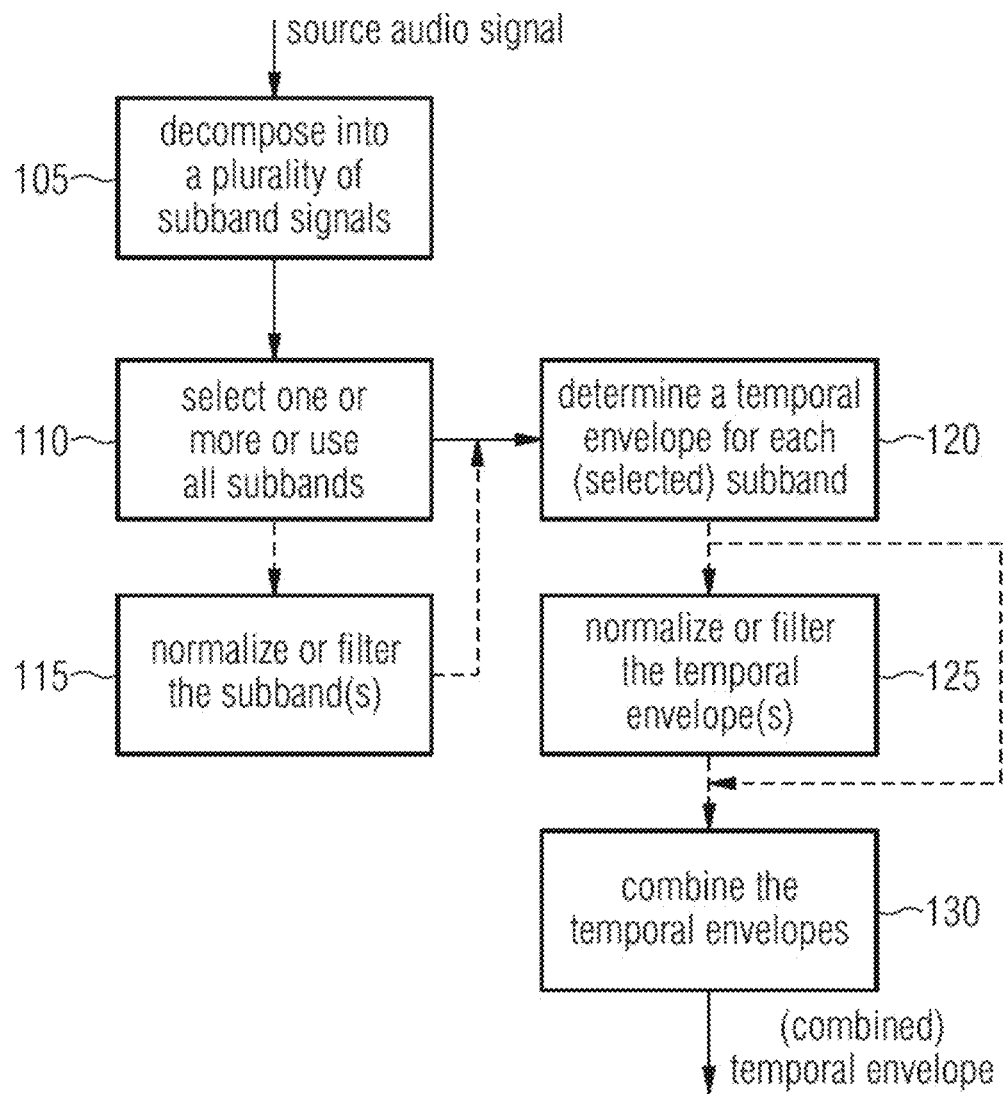
FIG. 2 is a more detailed description of an embodiment of the envelope determiner of FIG. 1.

In an embodiment, the envelope determiner is configured as illustrated in FIG. 2. In this embodiment, the source audio signal or at least the portion of the source audio signal is decomposed into a plurality of subband signals as illustrated at 105. One or more or even all subbands are selected or used as illustrated at 110 for the determination of individual temporal envelopes for each (selected) subband as illustrated at 120. As illustrated at 125, the temporal envelopes are normalized or filtered and, the individual temporal envelopes are combined to each other as indicated at 130 to obtain the final temporal envelope at the output of the envelope determiner. This final temporal envelope can be a combined envelope as determined by the procedure illustrated in FIG. 2. Depending on the implementation, an additional filtering stage 115 can be provided in order to normalize or filter the individual selected subbands. If all subbands are used, all such subbands are normalized or filtered as indicated in block 115. The normalization procedure indicated at 125 can be bypassed, and this procedure of not performing the normalization or filtering of the determined temporal envelopes is useful, when the subbands, from which the temporal envelopes are determined in block 120 have already been normalized or correspondingly filtered. Naturally, both procedures 115, 125 can be performed as well or, even alternatively, only the procedures of determining the temporal envelope for each (selected) subband 120 and the subsequent combination of the temporal envelopes 130 can be performed without any procedures illustrated by block 115 or 125.

In a further implementation, the decomposition in block 105 cannot be performed at all, but can be replaced by a high-pass filtering with a low crossover frequency such as a crossover frequency of 20, 50, 100 or, for example a frequency below 500 Hz and only a single temporal envelope is determined from the result of this high-pass filtering. Naturally, the high-pass filtering can also be avoided and, only a single temporal envelope from the source audio signal, and, typically, a frame of the source audio signal is derived, where the source audio signal is advantageously processed in typically overlapping frames, but non-overlapping frames can even be used as well. A selection indicated in block 110 is implemented in a certain scenario, when, for example, it is determined that a certain subband signal does not fulfill specific criteria with respect to subband signal features or is excluded from the determination of the final temporal envelope for whatever reason.

Figure 5:
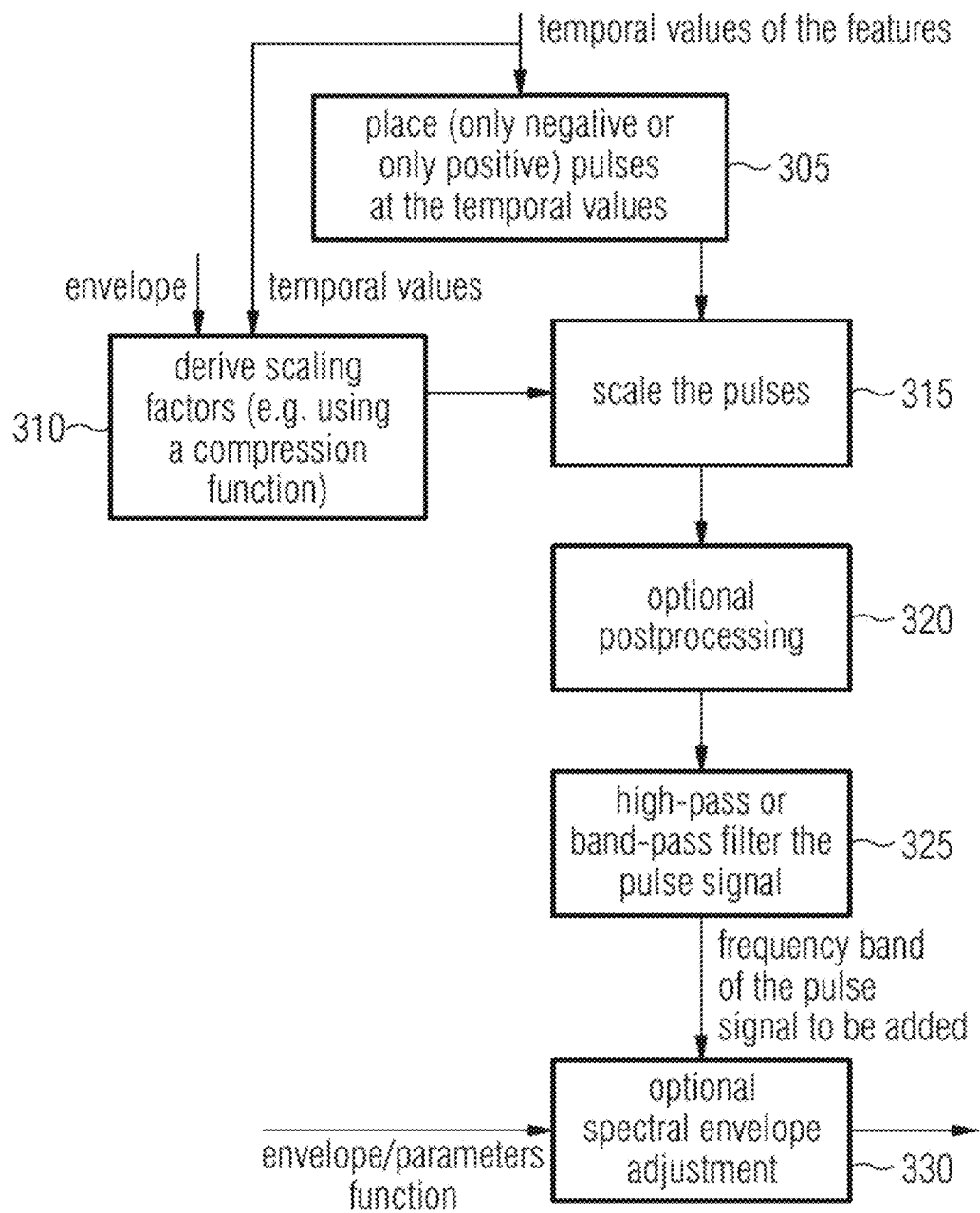
FIG. 5 illustrates an implementation of the signal synthesizer of FIG. 1.

FIG. 5 illustrates an implementation of the signal synthesizer 300. The signal synthesizer 300 receives, as an input from the analyzer 200, the temporal values of features and, additionally, further information on the envelope. In item 310, the signal synthesizer 300 illustrated in FIG. 5 derives scaling factors from the temporal envelope that are related to the temporal values. Therefore, block 310 receives envelope information such as envelope amplitudes on the one hand and temporal values on the other hand. The deriving of the scaling factors is performed, for example, using a compression function such a square root function, a power function with a power lower than 1.0 or, for example, a log function.

The signal synthesizer 300 comprises the procedure of placing 305 pulses at the temporal values where, advantageously, only negative or only positive pulses are placed in order to have synchronized phases of the related spectral values that are associated with a pulse. However, in other embodiments, and depending on, for example, other criteria derived from typically available gap-filling or bandwidth extension side information, a random placement of pulses is performed, typically, when the tonality of the baseband signal is not so high. The placement of negative or positive pulses can be controlled by the polarity of the original waveform. The polarity of the pulses can be chosen such that it equals the polarity of the original waveform having the highest crest factor. In other words, this means that positive peaks are modeled by positive pulses and vice versa.

In step 315, the pulses obtained by block 305 are scaled using the result of block 310 and, an optional postprocessing 320 is performed to the pulses. The pulse signal is available and the pulse signal is high-pass filtered or band-pass filtered as illustrated in block 325 in order to obtain a frequency band of the pulse signal, i.e., to obtain at least the band of the synthesis signal that is forwarded to the combiner. However, an optional spectral envelope adjustment 330 is applied to the signal output by the filtering stage 325, where this spectral envelope adjustment is performed by using a certain envelope function or a certain selection of envelope parameters as derived from side information or as alternatively, derived from the source audio signal in the context of, for example, blind bandwidth extension applications.

Figure 6:
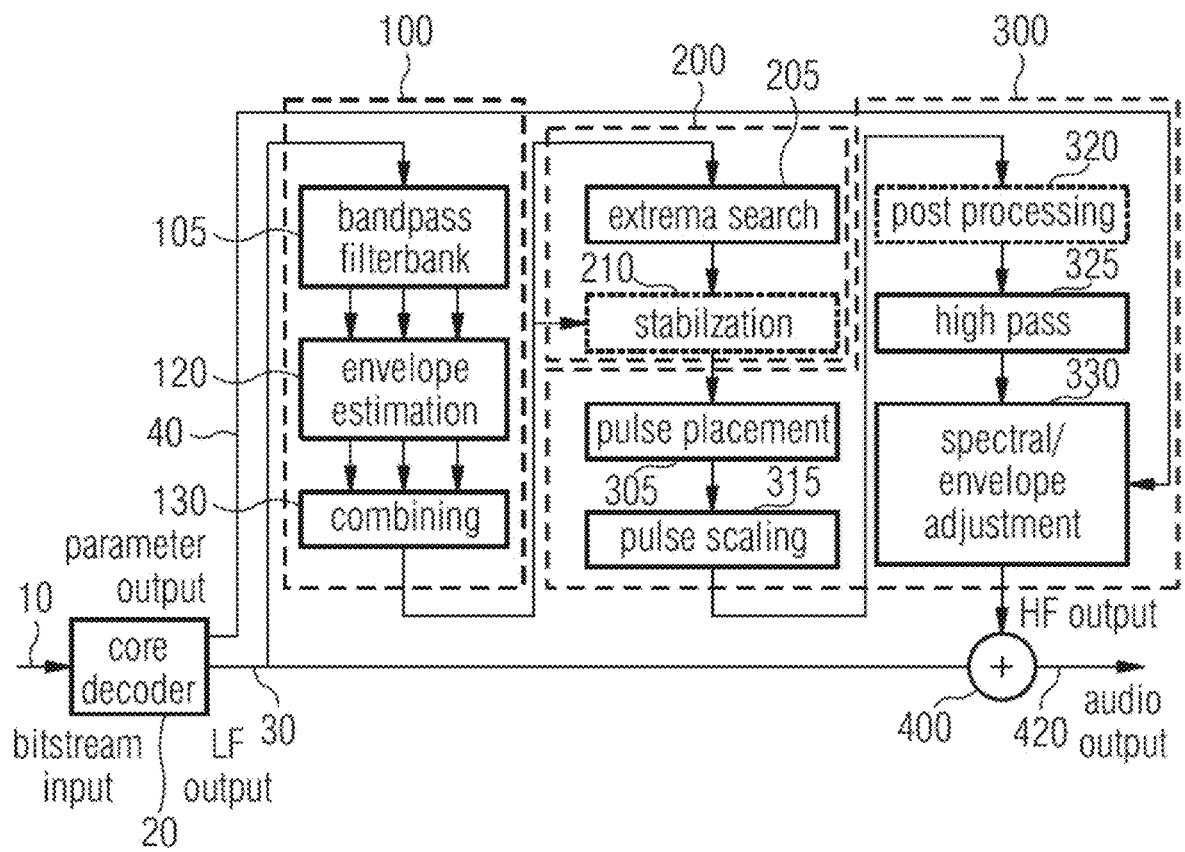
FIG. 6 illustrates an embodiment of the audio processor as a device or method used in the context of a core decoder.

FIG. 6 illustrates an embodiment of an audio processor or a method of audio processing for generating a frequency enhanced audio signal. The inventive approach termed Waveform Envelope Synchronized Pulse Excitation (WESPE) is based on the generation of a pulse train-like signal, wherein the actual pulse placement is synchronized to a dedicated time domain envelope. This so-called common envelope is derived from the LF signal that is obtained at the output of the core decoder 20, via a set of bandpass signals, whose individual envelopes are combined into one common envelope.

FIG. 6 shows a typical integration of the WESPE processing into an audio decoder featuring bandwidth extension (BWE) functionality, which is also an embodiment of the new technique. This implementation operates on time frames with duration of e.g. 20 ms, optionally with temporal overlap between frames. e.g. 50%.

Upsides of newly proposed WESPE BWE
Mitigation of roughness and beating artefacts
Harmonic continuation of signals
Preserves pulses
Suitable as speech BWE
Can handle music as well
BWE crossover might start at 2 kHz or lower already
Self-adjusting BWE with respect to tonality, pitch alignment, harmonicity, phase The WESPE processing comprises the following steps:
1. Temporal envelope estimation 100: The LF signal obtained from the core decoder 20 is split (105) into a collection of bandpass signals. Next, the temporal envelope is determined 120 for each of the bandpass signals. Optionally, normalization or filtering of the individual envelopes may be applied. Then, all temporal envelopes are combined 130 into a common envelope. Advantageously, the combining operation is an averaging process.
2. Synchronized pulse placement: The common envelope derived in step 1 is analyzed 205 by application of curve calculus, advantageously for the location of its local maxima. The obtained maxima candidates might optionally be post-selected or stabilized with regard to their 210 temporal distance. A Dirac pulse is placed 305 in the estimated "raw" signal for HF generation at each maximum location. Optionally, this process might be supported by side information.
3. Individual pulse magnitude scaling derived from envelope: The pulse train assembled in the previous step 2 is weighted 315 by temporal weights derived from the common envelope.
4. Post processing, HF extraction or gap filling selection: The "raw" signal generated in step 3 is optionally post-processed 320, e.g. by noise addition, and is filtered 325 for use as HF in BWE or as a gap filing target tile signal.
5. Energy adjustment: The spectral energy distribution of the filtered signal from step 4 is adjusted 330 for use as HF in BWE or as a gap filling target tile signal. Here, side information 40 from the bit stream on the desired energy distribution is used.
6. Mixing of HF or gap filling signal with LF: Finally, the adjusted signal from step is mixed 400 with the core coder output 30 in accordance with usual BWE or gap filling principles, i.e. passing a HP filter and complementing the LF, or filling spectral holes in the gap filling spectral regions.

In the following, the function of each of the steps comprised in the WESPE processing will be further explained giving example signals and their effect on the processing result.

Proper temporal common envelope estimation is a key part of WESPE. The common envelope allows for estimation of averaged and thus representative perceptual properties of each individual time frame.

If the LF signal is very tonal with pitch f0 and a strong Δf0-spaced overtone line spectrum, several lines will appear in every one of the individual bandpass signals, if their passband width can accommodate them, producing strong coherent envelope modulations through beatings within all of the bandpass bands. Averaging of temporal envelopes will preserve such a coherent envelope modulation structure found across bandpass envelopes and will result in strong peaks at approximately equidistant locations spaced ΔT0=1/(Δf0). Later, through applying curve calculus, strong pulses will be placed at these peak locations, forming a pulse train that has a spectrum consisting of discrete equidistant lines at locations n*Δf0, n=1 . . . N.

In case a strong tonal signal has either no overtones at all, or the bandwidth of the bandpass filters cannot accommodate more than one of these overtones in each of the individual bands, the modulation structure will not show up in all bandpass signals and consequently not dominate the averaged common envelope. The resulting pulse placement will be based on mostly irregularly spaced maxima and thus be noisy.

The same is true for noisy LF signals that exhibit a random local maxima placement in the common envelope signal: these lead to a pseudo-random pulse placement.

Transient events are preserved since in this case all of the bandpass signals share a temporally aligned common maximum that will thus also appear in the common envelope.

Bandpasses should be dimensioned such that they span a perceptual band and that they can accommodate at least 2 overtones for the highest frequency that is resolved. For better averaging, bandpasses might have some overlap of their transition bands. This way, the tonality of the estimated signal is intrinsically adapted to the LF signal. Bandpasses might exclude very low frequencies below e.g. 20 Hz.

Synchronized temporal pulse placement and scaling is the other key contribution of WESPE. The synchronized pulse placement inherits the representative perceptual properties condensed in the temporal modulations of the common envelope and imprints them into a perceptually adapted raw fullband signal.

Note that human perception of high frequency content is known to function through evaluation of modulations in critical band envelopes. As has been detailed before, temporal pulse placement synchronized to the common LF envelope enforces similarity and alignment of perceptually relevant temporal and spectral structure between LF and HF.

In case of very tonal signals with strong and clean overtones, like e.g. pitch pipe, WESPE can ensure through additional optional stabilization that the pulse placement is exactly equidistant leading to a very tonal HF overtone spectrum of the "raw" signal.

Weighting the pulses with the common envelope ensure that dominating modulations are preserved in strong pulses whereas less important modulations result in weak pulses, further contributing to the WESPE property of intrinsic adaption of the "raw" signal to the LF signal.

In case of a noisy signal, if pulse placement and weighting is becoming increasingly random, this leads to a gradually noisier "raw" signal, which is a very much desired property.

The remaining processing steps, HF extraction, energy adjustment and mixing are further steps that are used to integrate the novel WESPE processing into a codec to fit the full functionality of BWE or gap filling.

Figure 3A:
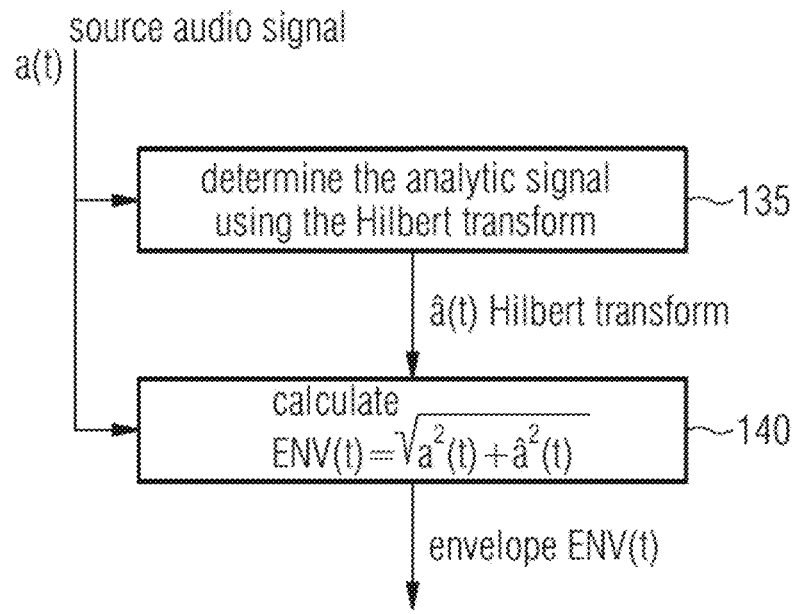
FIG. 3a is an embodiment for calculating the temporal envelope of a subband or full-band audio signal.

FIG. 3a illustrates an implementation for the determination of the temporal envelope. As illustrated at 135, the analytic signal is determined using a Hilbert transform. The output of block 135, i.e., the Hilbert transform signal is used for the calculation of the envelope ENV(t) illustrated at 140. To this end, the envelope is calculated as squaring the original source audio signal temporal values at certain time instants and the squaring of the corresponding Hilbert transform values at the certain time instants and to adding the squared values and calculating the square root from the result of the adding for each individual time instant. By this procedure, the temporal envelope is determined with the same sample resolution as the original source audio signal a(t). Naturally, the same procedure is performed when the input into block 135 and 140 is a subband signal as obtained by block 105, or as selected by block 110 or as normalized and filtered by block 115 of FIG. 2.

Figure 3B:
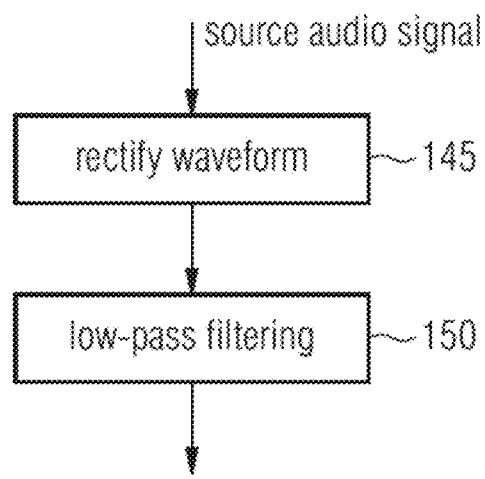
FIG. 3b is an alternative implementation of the generation of a temporal envelope.

Another procedure for calculating a temporal envelope is illustrated in block 145 and 150 of FIG. 3b. To this end, the waveform of the source audio signal or a subband from the source audio is rectified (145) and, the rectified signal is low-pass filtered (150), and the result of this low-pass filtering is the envelope of the source audio signal or is the envelope of an individual subband signal that is combined with other such envelopes from other subbands, advantageously by averaging as illustrated at 130 in FIG. 2.

The publication "Simple empirical algorithm to obtain signal envelope in the three steps", by C. Jarne, Mar. 20, 2017 illustrates other procedures for calculating temporal envelopes such as the calculation of an instantaneous root mean square (RMS) value of the waveform through a sliding window with finite support. Other procedures consist of calculating a piece-wise linear approximation of the waveform where the amplitude envelope is created by finding and connecting the peaks of the waveform in a window that moves through the data. Further procedures rely on the determination of permanent peaks in the source audio signal or the subband signal and the derivation of the envelope by interpolation.

Other procedures for calculating the temporal envelope comprise interpreting side information representing the envelope or performing a prediction in the spectral domain over a set of spectral values derived from a time domain frame as known from TNS (Temporal Noise Shaping), where the corresponding prediction coefficients represent a temporal envelope of the frame.

Figure 3C:
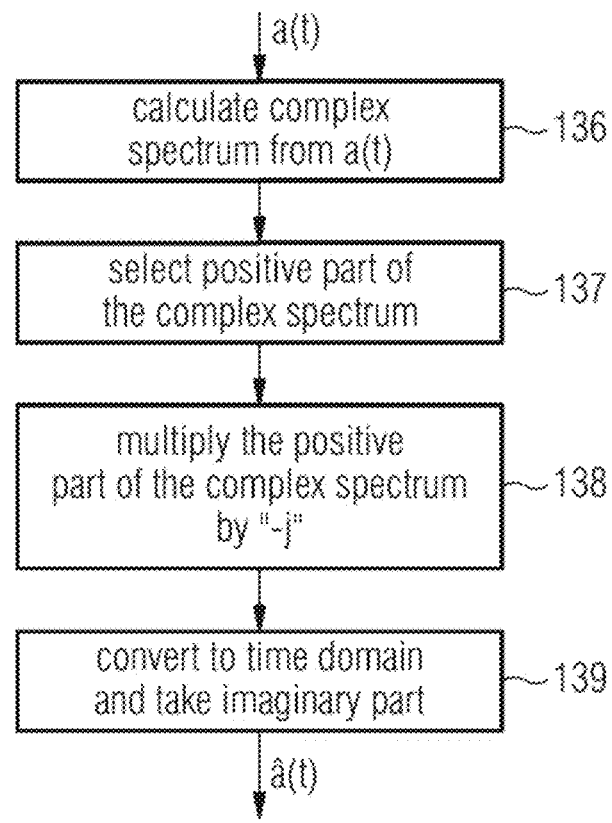
FIG. 3c illustrates a flowchart for an implementation of the determination of the analytic signal of FIG. 3a using a Hilbert transform.

FIG. 3c illustrates an implementation of the determination of the analytic signal using the Hilbert transform indicated at 135 in FIG. 3a. Procedures for calculating such Hilbert transforms are, for example, illustrated in "A Praat-Based Algorithm to Extract the Amplitude Envelope and Temporal Fine Structure Using the Hilbert Transform", He, Lei, et al, INTERSPEECH 2016-1447, pages 530-534. In a step 136, a complex spectrum is calculated from the signal a(t), for example, the source audio signal or a subband signal. In step 137, a positive part of the complex spectrum is selected or the negative part is deselected. In step 138, the positive part of the complex spectrum is multiplied by "-j" and, in step 139, the result of this multiplication is converted into the time domain and by taking the imaginary part, the analytic signal $\hat{a}(t)$ is obtained.

Naturally, many other procedures for determining the temporal envelope are available and, it is to be noted that the temporal envelope does not necessarily have to actually "envelope" the time domain signal, but it can, of course, be that some maxima or minima of the time domain signal are higher or smaller than the corresponding envelope value at this point of time.

Figure 4:
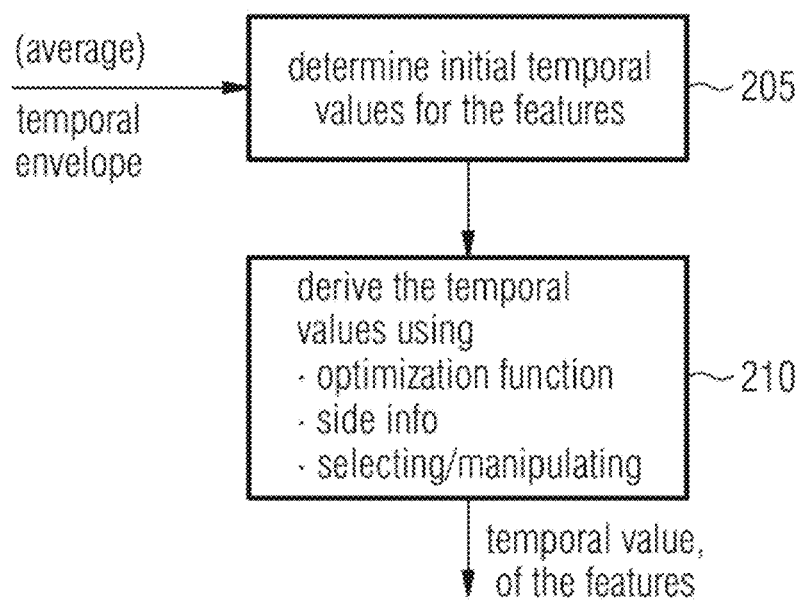
FIG. 4 illustrates an implementation of the analyzer of FIG. 1.

FIG. 4 illustrates an embodiment of the procedure of determining the temporal values of the certain features of the temporal envelope. To this end, an average temporal envelope is introduced into block 205 for the determination of initial temporal values for the features. These initial temporal values can, for example, be the temporal values of actually found maxima within the temporal envelope. The final temporal values of the features, at which the actual pulses are placed, are derived from the raw temporal values or from the "initial" temporal values by means of an optimization function, by means of a side information, or by means of selecting or manipulating the raw features as indicated by block 210. Advantageously, block 210 is so that the initial values are manipulated in accordance with a processing rule or in accordance with an optimization function. Particularly, the optimization function or processing rule is implemented so that temporal values are placed in a raster with a raster spacing T. Particularly, the raster spacing T and/or the position of the raster within the temporal envelope is so that a deviation value between the temporal values and the initial temporal values has a predetermined characteristic where, in embodiments, the deviation value is a sum over squared differences, and/or the predetermined characteristic is the minimum. Thus, subsequent to the determination of the initial temporal values, a raster of equidistant temporal values is placed which matches the non-constant raster of the initial temporal values as close as possible, but now shows a clear and ideal tonal behavior. The raster can be determined in the upsampled domain having a finer temporal granularity compared to the non-upsampled domain, or one can alternatively use fractional delay for pulse placement with sub-sample precision.

Figure 7:
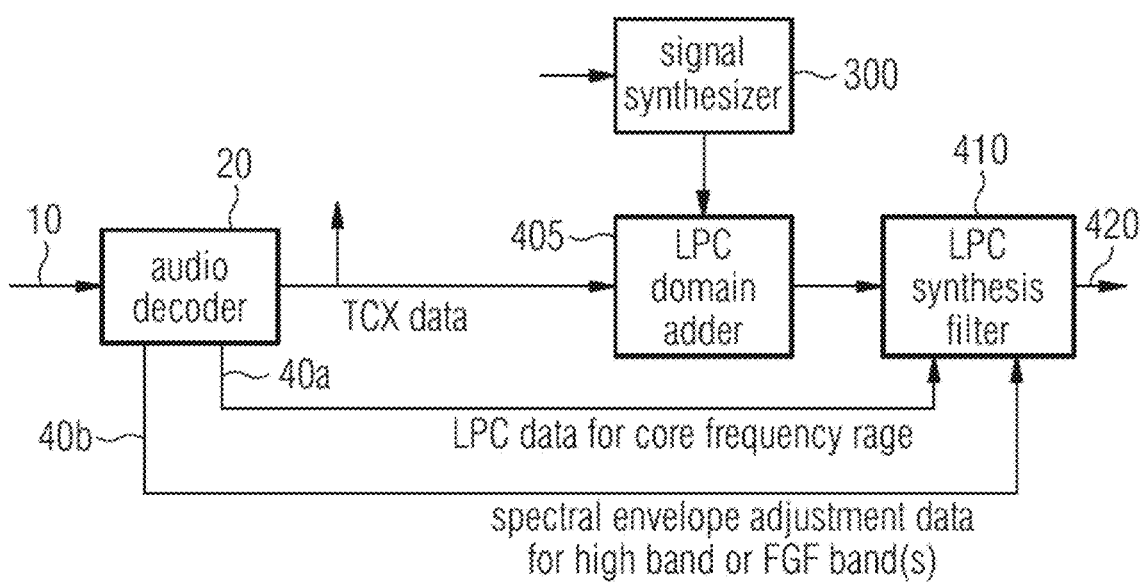
FIG. 7 illustrates an implementation, where the combination of the synthesis signal and the source audio signal is performed in the LPC domain.

FIG. 7 illustrates a further embodiment of the present invention in the context of LPC processing. As illustrated, for example, in FIG. 1 or FIG. 6, the audio processor of FIG. 7 comprises the envelope determiner 100, the analyzer 200 (both not shown in FIG. 7) and the signal synthesizer 300. In contrast to FIG. 6, however, the core decoder output data, i.e., the LF output 30 is not a time domain audio signal, but is an audio signal which is in the LPC time domain. Such data can be found typically within a TCX (Transform Coded eXcitation) coder as an internal signal representation.

The TCX data generated by the audio decoder 20 in FIG. 7 are forwarded to the mixer that is indicated in FIG. 7 as the LPC domain adder 405. The signal synthesizer generates TCX frequency-enhancement data. Thus, the synthesis signal generated by the signal synthesizer is derived from the source audio signal being a TCX data signal in this embodiment. Thus, at the output of block 405, a frequency-enhanced audio signal is available that, however, is still in the LPC time domain. A subsequently connected LPC synthesis filter 410 performs the transform of the LPC time domain signal into the time domain.

The LPC synthesis filter is configured to additionally perform a kind of deemphasis if used and, additionally, this time domain filter is configured to also perform the spectral envelope adjustment for the synthesis signal band. Thus, the LPC synthesis filter 410 in FIG. 7 not only performs synthesis filtering of the TCX data frequency range output by the audio decoder 20 but also performs spectral envelope adjustment for the data in the spectral band that is not included in the TCX data output by the audio decoder 20. Typically, this data is also obtained from the encoded audio signal 10 by means of the audio decoder 20 extracting the LPC data 40a for the core frequency range and additionally extracting the spectral envelope adjustment for the high-band or, for IGF (Intelligent Gap Filling), one or more bands indicated at 40b of FIG. 7. Thus, the combiner or mixer in FIG. 1 is implemented by the LPC domain adder 405 and the subsequently connected LPC synthesis filter 410 of FIG. 7 so that the output of the LPC synthesis filter 410 indicated at 420 is the frequency enhanced time domain audio signal. In contrast to the procedure in FIG. 6, where the spectral envelope adjustment 330 is performed before performing the mixer operation by the combiner 400, FIG. 7 performs envelope adjustment of the high-band or filling band subsequent to mixing or combining both signals.

Figure 8:
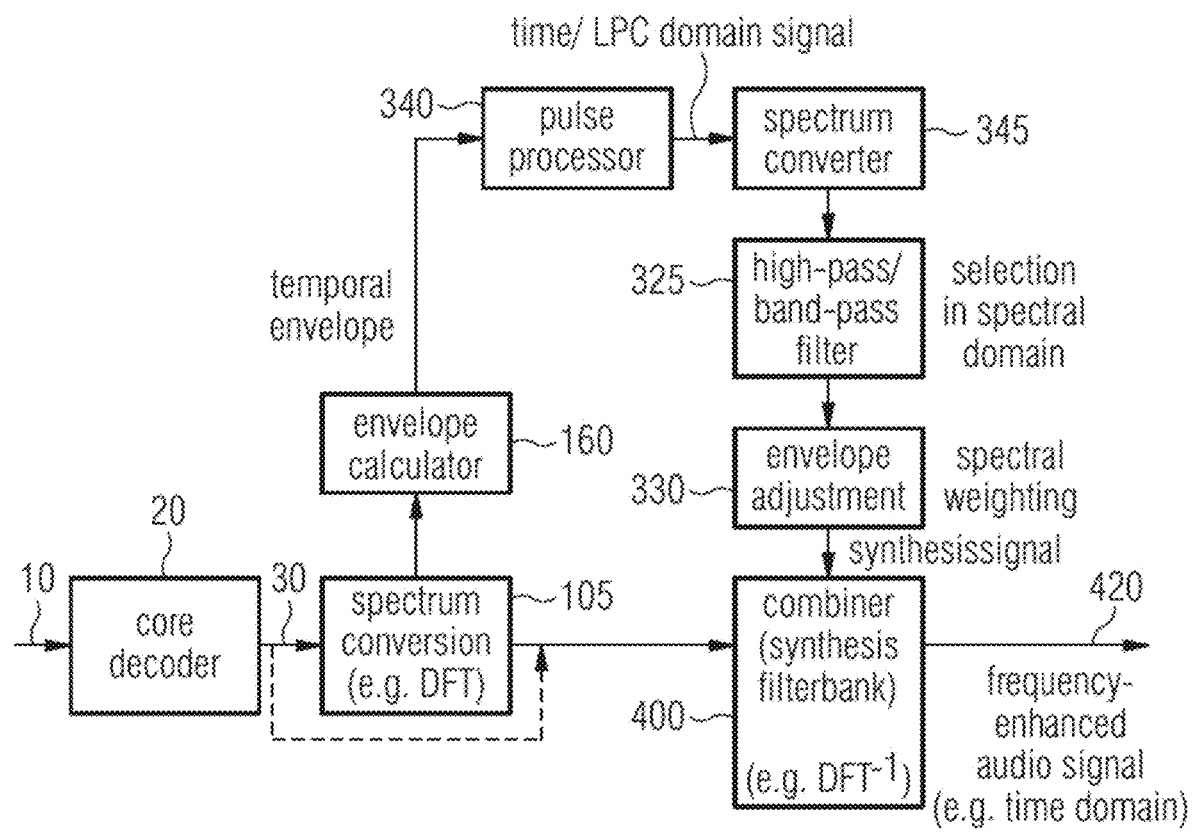
FIG. 8 illustrates a further embodiment of the present invention where the high pass or band-pass filter, the envelope adjustment and the combination of the source audio signal and the synthesis signal are performed in the spectral domain.

FIG. 8 illustrates a further implementation of the procedure illustrated in FIG. 6. Basically, the FIG. 6 implementation is performed in the time domain so that blocks 320, 325, 330, 400 are performed fully in the time domain. Alternatively, the FIG. 8 implementation relies on a spectrum conversion 105 for the low band which, however, is an optional measure, but the spectrum conversion operation 105 in FIG. 8 for the low band is advantageously used for the implementation of the bandpass filter bank 105 in FIG. 6. Additionally, the FIG. 8 implementation comprises a spectrum converter 345 for converting the output of the pulse processor 340 typically comprising the pulse placement 305 and the pulse scaling 315 of FIG. 6. The pulse processor 340 in FIG. 8 additionally may comprise the stabilizer block 210 as an optional feature, and the extrema search block 205 as an optional feature.

However, the procedures of high pass filtering 325, envelope adjustment 330 and the combination of the low band and the high band is done by a synthesis filter bank, i.e., is done in the spectral domain, and the output of the synthesis filter bank 400 in FIG. 8 is the time domain frequency enhanced audio signal 420. However, if element 400 is implemented as a simple combiner for combining different bands, the output of block 400 can also be a full spectral domain signal typically consisting of subsequent blocks of spectral values that are further processed in any manner entailed.

In the following, three examples are given of characteristic signals that have been bandwidth extended using WESPE BWE. Sample rate was 32 kHz, a DFT (105 in FIG. 8) with single sided spectrum having 513 lines was used to extract 8 overlapping bandpass signals. For implementing the 4 kHz high pass (325 in FIG. 8), the spectral envelope adjustment (330 in FIG. 8) and the mixing (400 in FIG. 8) of LF and HF, a similar DFT/IDFT (345 in FIG. 8) with 50% overlap was employed organized in 16 uniform scale factor bands. The resulting signal shown in the spectrograms is noncoded PCM from DC to 4 kHz and generated by WESPE from 4 kHz to 16 kHz.

Figure 9A:
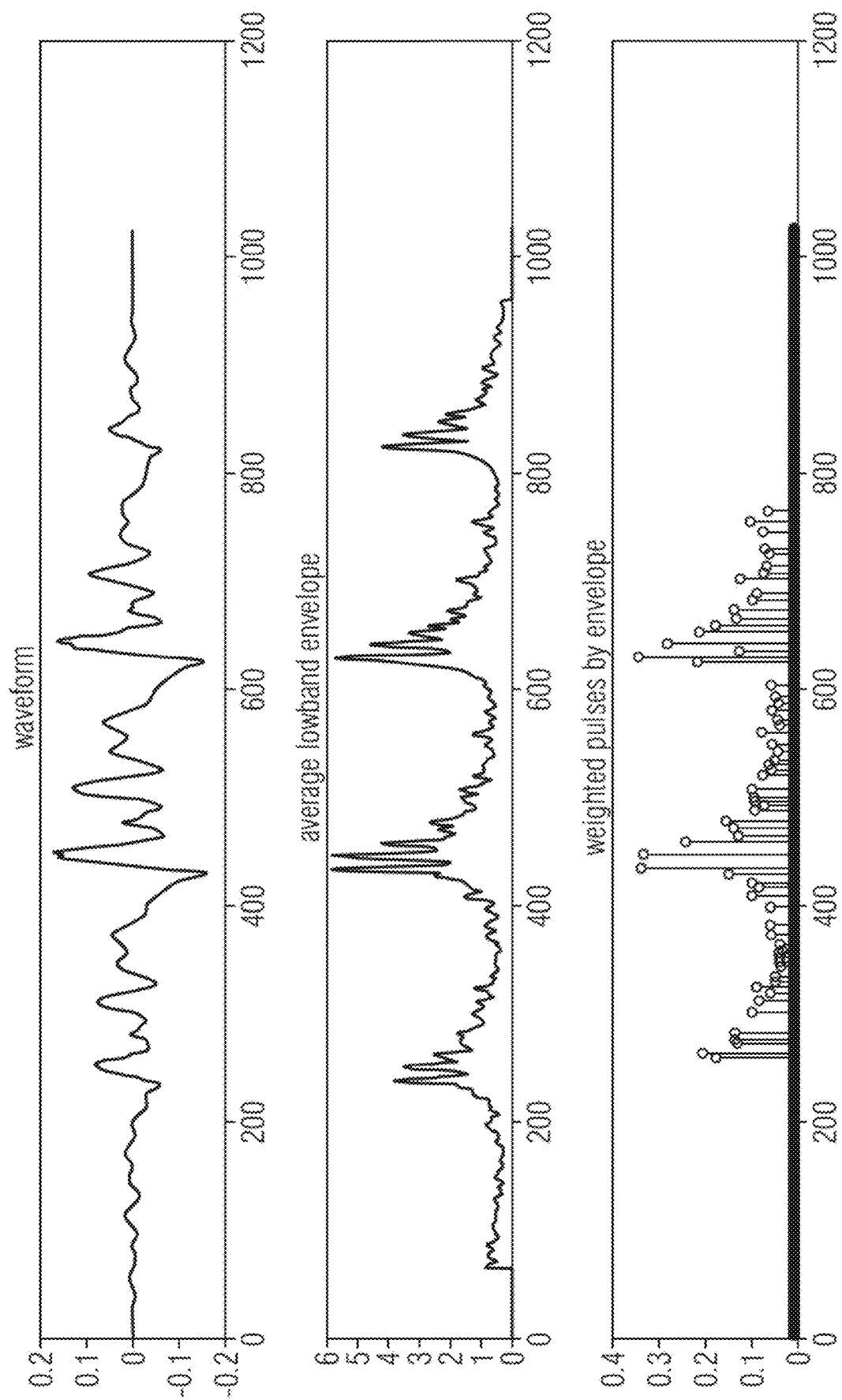
FIG. 9a illustrates several signals in the process of frequency enhancement with respect to a sound item "German male speech"

FIG. 9a shows a short excerpt (one 1024 samples block) of the wave form, the common envelope and the resulting synchronized and scaled pulse placement by WESPE. Large pulses with some slight dispersion are placed approximately equidistantly in a wide periodic structure.

Figure 9B:
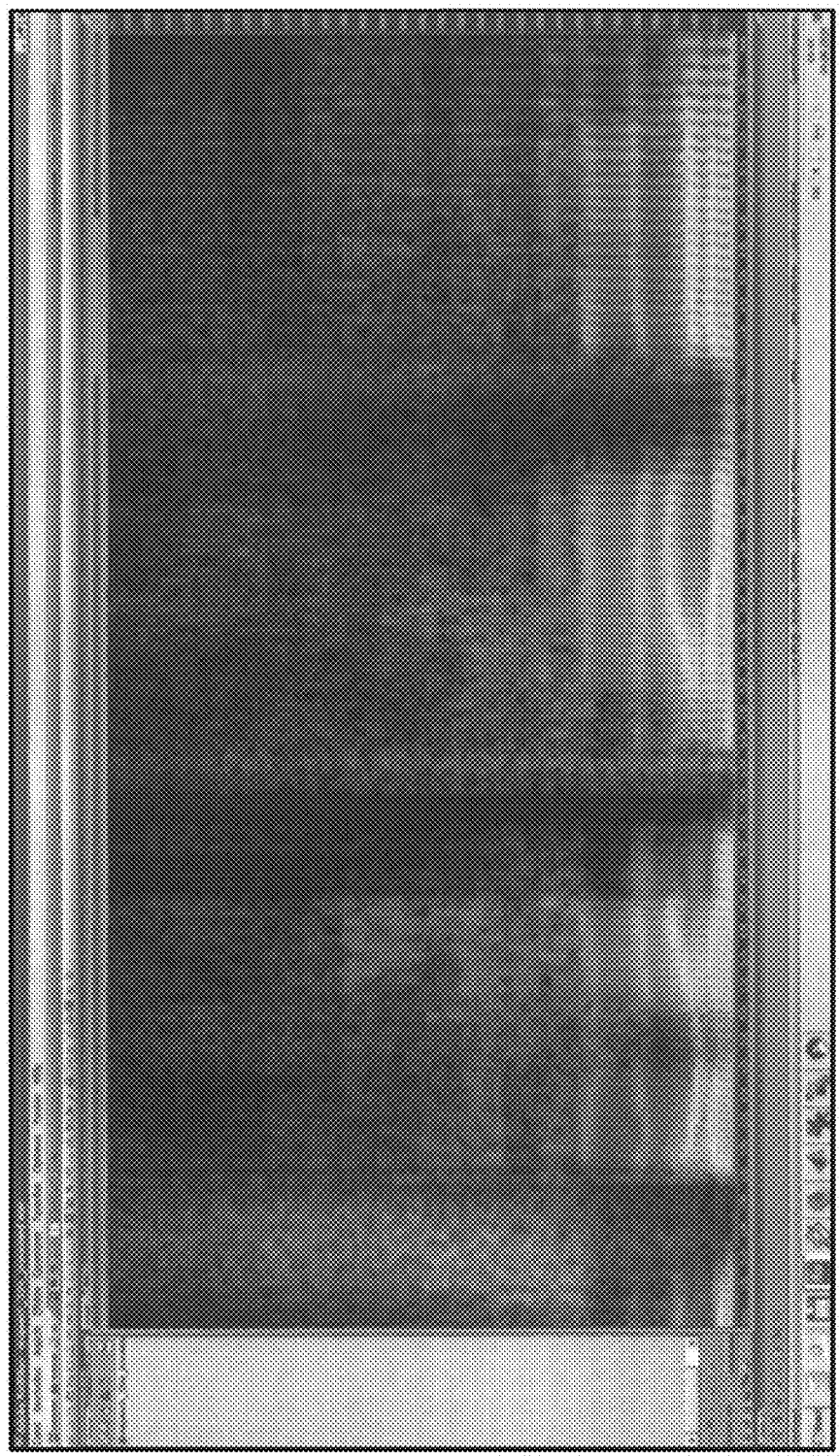
FIG. 9b illustrates a spectrogram for the sound item "German male speech"

FIG. 9b depicts the spectrogram of the entire test item. The vertical pulse structure of voiced speech maintains coherently aligned between LF and HF, whereas fricatives exhibit a noise like HF structure.

Hence, FIG. 9a shows how WESPE models speech pulses, shows a waveform, common envelope, and a pulse generation, where the item is "German male speech". FIG. 9b shows how WESPE models speech pulses and shows a spectrogram. The Item is "German male speech".

Figure 10B:
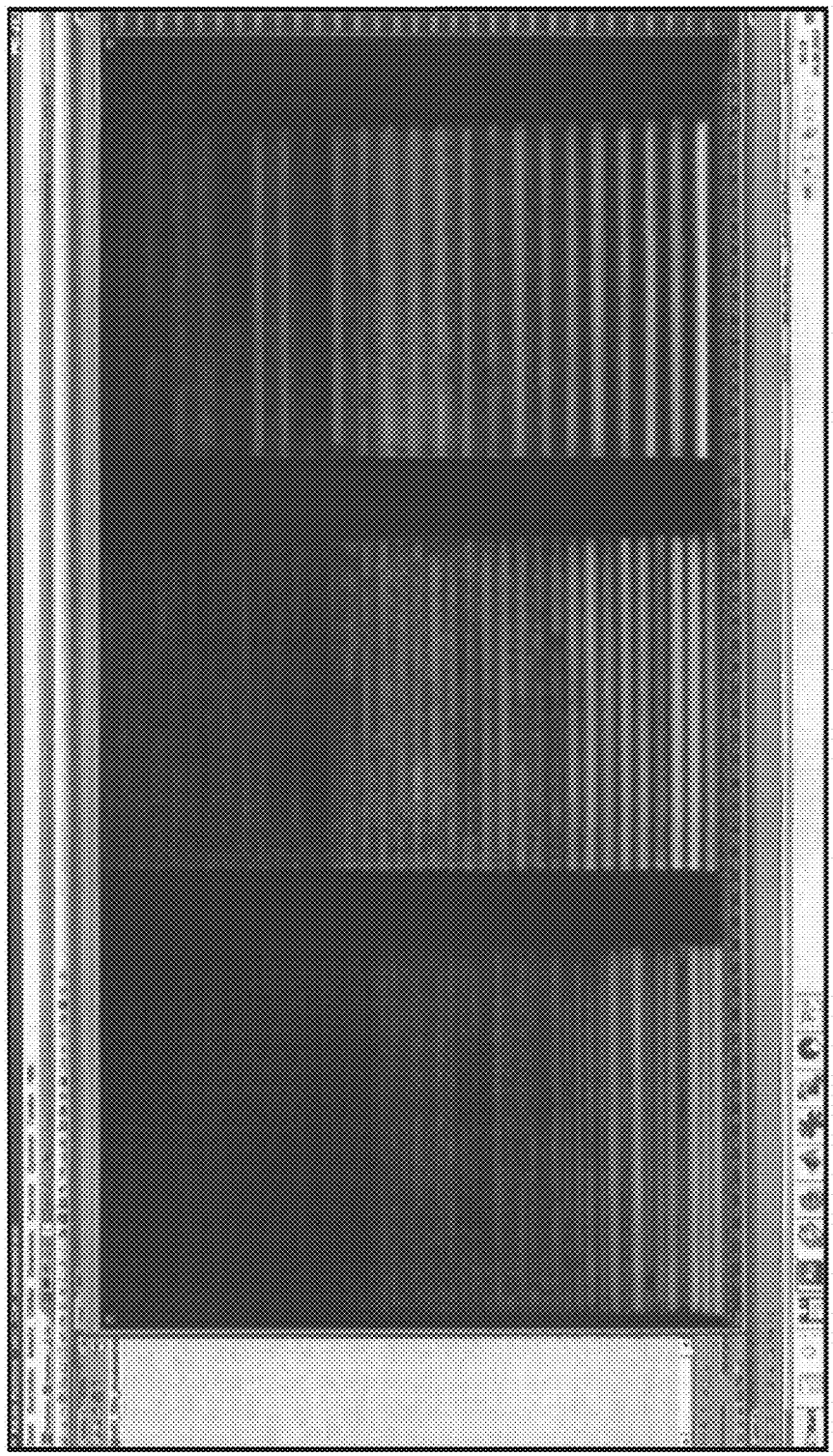
FIG. 10b illustrates a spectrogram for the sound item "pitch pipe"

FIG. 10a shows a short excerpt (one 1024 samples block) of the wave form, the common envelope and the resulting synchronized and scaled pulse placement by WESPE. Distinct sharp pulses are placed equidistantly in a narrow periodic structure. FIG. 10b depicts the spectrogram of the entire test item. The horizontal line structure of pitch pipe maintains aligned between LF and HF, however, the HF is also somewhat noisy and would profit from additional stabilization.

FIG. 10a shows how WESPE models harmonic overtones, and shows a waveform, a common envelope, and pulse generation. The Item is "Pitch pipe". FIG. 10b shows how WESPE models harmonic overtones and shows a spectrogram. The Item is "Pitch pipe".

Figure 11A:
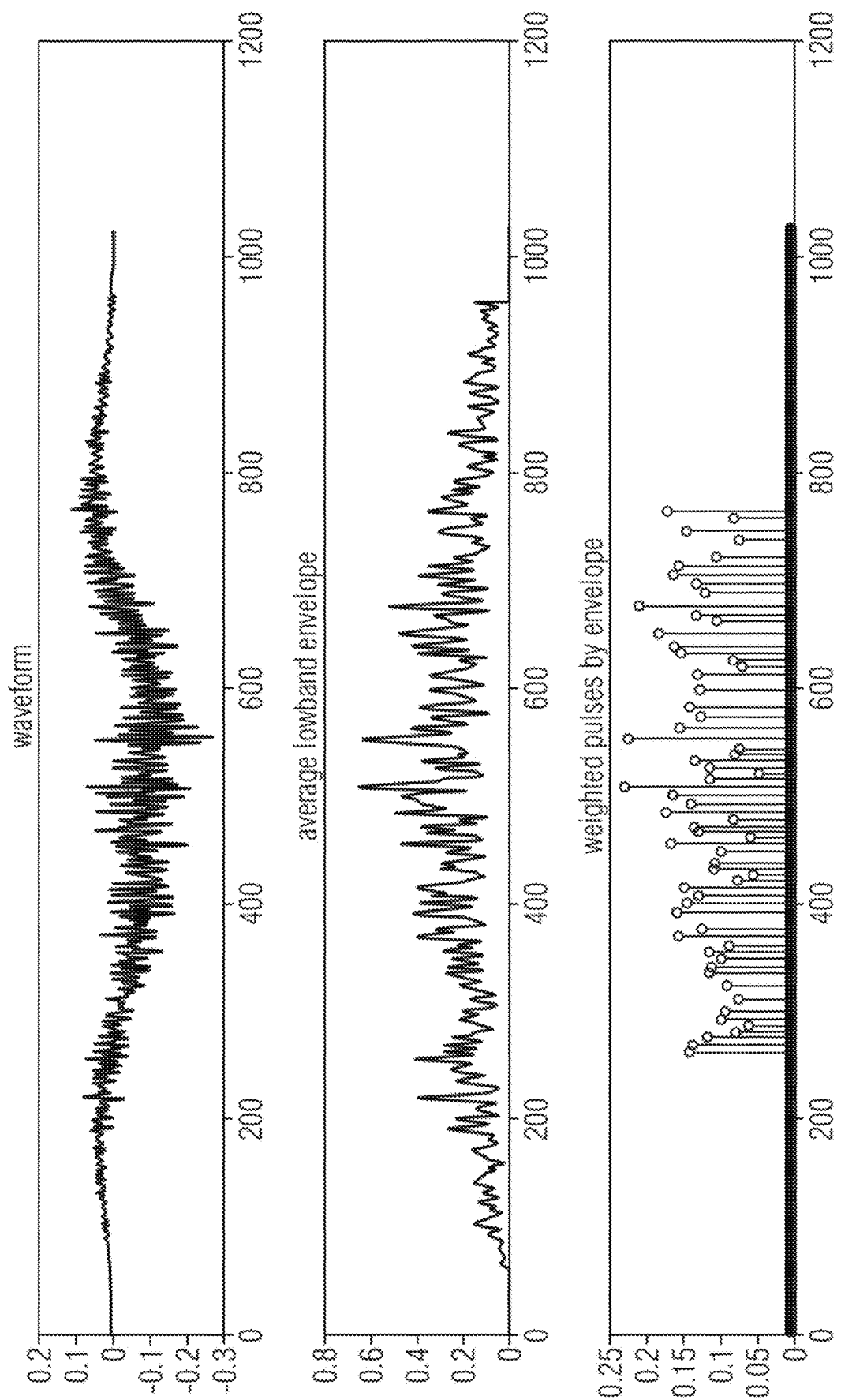
FIG. 11a illustrates several signals in the process of frequency enhancement with respect to a sound item "Madonna Vogue"
Figure 11B:
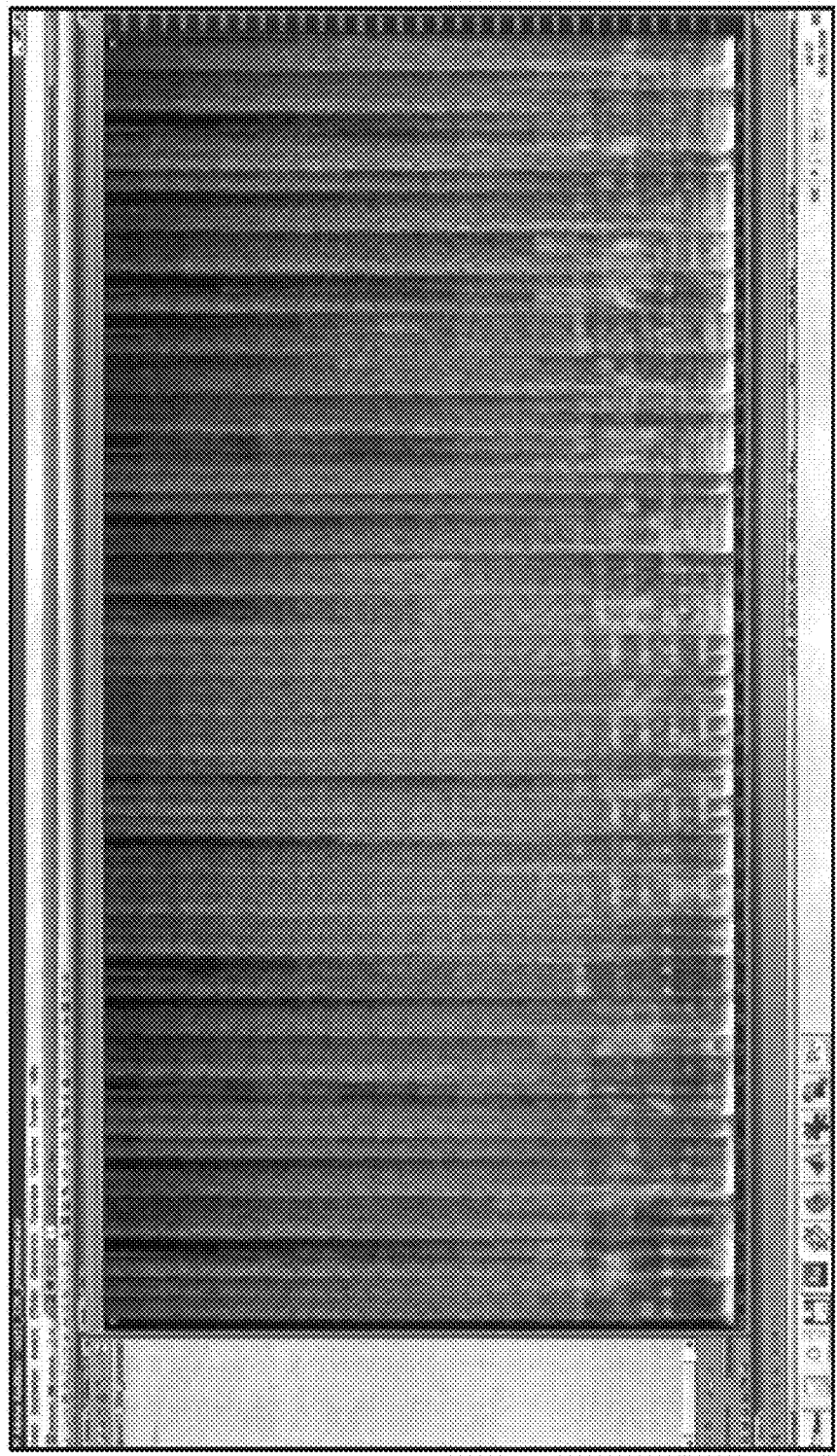
FIG. 11b illustrates several signals in the process of frequency enhancement with respect to a sound item "Madonna Vogue".

FIG. 11a shows a short excerpt (one 1024 samples block) of a wave form of test item Madonna Vogue, the common envelope and the resulting synchronized and scaled pulse placement by WESPE. Placement and scaling of pulses have almost random structure. FIG. 11b depicts the spectrogram of the entire test item. The vertical transient structures of pop music maintain coherently aligned between LF and HF, whereas HF tonality is mostly low.

FIG. 11a shows how WESPE models a noisy mixture, and shows a waveform, a common envelope, and a pulse generation. The Item is "Vogue". FIG. 11b shows how WESPE models a noisy mixture and shows a spectrogram. The Item is "Vogue". End insert C The first picture in FIGS. 9a, 10a, 11a illustrates a waveform of a block of 1024 samples of a low band source signal. Additionally, the influence of the analysis filter for extracting the block of samples is shown in that the waveform is equal to 0 at the beginning of the block, i.e., at sample 0 and is also 0 at the end of the block, i.e., at sample 1023. Such a waveform is, for example, available at the input into block 100 of FIG. 1 or at in FIG. 6. The vertical axis in FIGS. 9a, 9b, 9c always indicates a time domain amplitude and the horizontal axis in these figures always indicates the time variable and, particularly, the sample number typically extending from 0 to 1023 for one block.

The second picture in FIGS. 9a, 10a, 10b illustrates the averaged low band envelope and, particularly, only the positive part of the low band envelope. Naturally, the low band envelope typically is symmetric and also extends into the negative range. However, only the positive part of the low band envelope is used. It is visible from FIGS. 9a, 10a and 11a that in this embodiment, the envelope has only been calculated while excluding the first couple of samples of the block and the last couple of samples of the block which, however, is not at all an issue, since the blocks may be calculated in an overlapping manner. Thus, the second picture of FIGS. 9a, 10a, 11a, typically illustrate the output of block 100 of FIG. 1 or the output of block 130 of FIG. 2, for example.

The third picture of FIG. 9a, 10a, 11a, illustrates the synthesis signal subsequent to pulse scaling, i.e., subsequent to the processing, in which the pulses are placed at the temporal values of the features of the envelope and have been weighted by the corresponding amplitudes of the envelope. FIGS. 9a, 10a, 11a illustrate that the placed pulses only extend from sample 256 to sample 768. Thus, the signal consisting of the weighted pulses only extends over 512 samples and does not have any portion before these samples and subsequent to these samples, i.e., covers the mid part of a frame. This reflects the situation that the preceding frame has an overlap and the subsequent frame has an overlap as well. For the purpose of generating a pulse signal with subsequent blocks, the pulse signal from the next block would also be processed in that the first quarter and the last quarter is missing and, therefore, the pulse signal from the next block would be placed immediately subsequent to the illustrated pulse signal from the current block in FIGS. 9a, 10a, 11a. This procedure is very efficient, since any overlap/add operations of the pulse signal is not necessary. However, any overlap/add procedures or any cross fading procedures from one frame to the next with respect to the pulse signal can also be performed if used.

FIGS. 9b, 10b, 11b illustrate spectrograms. The horizontal axis represents the time, but not the time with respect to samples as in FIGS. 9a, 10a, 11a, but the time with respect to DFT block numbers. The vertical axis illustrates the frequency spectrum from low frequencies at the bottom of the corresponding figures until high frequencies on top of the corresponding figures. The horizontal range extends from 0 to 16 kHz so that the lower quarter represents the original signal and the upper three quarters represent the synthesis signal. Thus, FIGS. 9b, 10b, 11b illustrate the frequency enhanced audio signal while only the lower quarter of these figures illustrates the source audio signal.

The figures indicate that the low band structure is very well reflected in the high band. This is particularly visible with respect to FIG. 10b illustrating a pitch pipe where the three different tones of the pitch pipe are played one after the other from left to right in FIG. 10b. Particularly, the first portion to the left of FIG. 10b is the lowest tone of the pitch pipe, the medium portion is the medium tone of the pitch pipe and the right portion of FIG. 10b is the highest tone of the pitch pipe. The pitch pipe is specifically characterized by a very tonal spectrum and it appears that the present invention is particularly useful in replicating the harmonic structure in the higher 12 kHz very well.

With respect to the third test item, it becomes visible that the low band structure for such a pop music item is very well transformed into the high frequency range by means of the inventive procedure.

Figure 12:
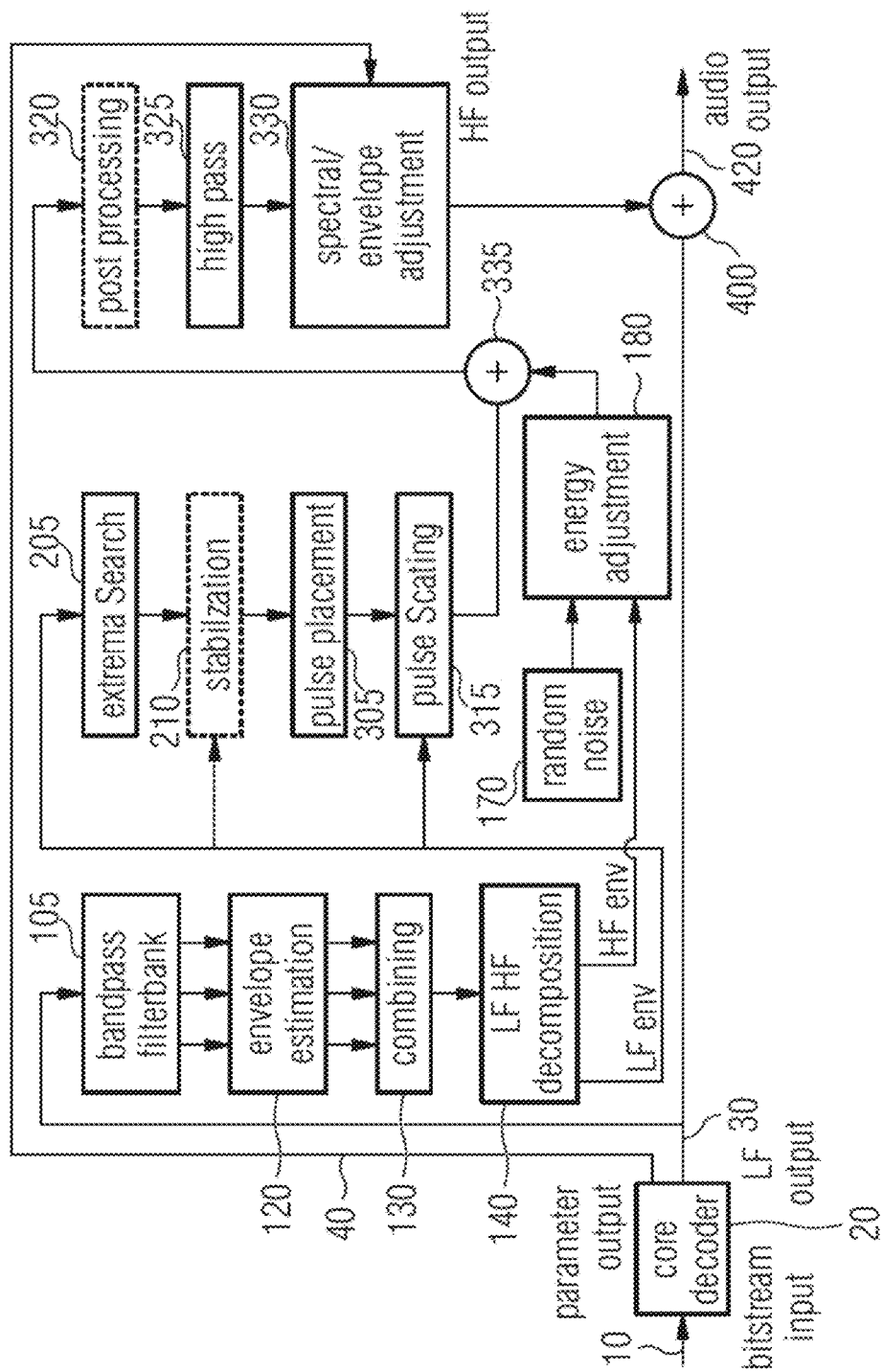
FIG. 12 illustrates a further embodiment of the audio processor as a device or method used in the context of a core decoder.

FIG. 12 illustrates a further embodiment that is somewhat similar to the FIG. 6 embodiment. Therefore, similar reference numerals in FIG. 6 are indicating similar items as in FIG. 12. In addition to the features in FIG. 6, the FIG. 12 embodiment additionally comprises an LF/HF decomposer 160, a random noise or pseudo random noise generator 170 such as a noise table or so, and an energy adjuster 180.

The LF/HF decomposer 160 performs a decomposition of the temporal envelope into an LF envelope and a HF envelope. Advantageously, the LF envelope is determined by lowpass filtering and the HF envelope is determined by subtracting the HF envelope from the LF envelope.

The a random noise or pseudo random noise generator 170 generates a noise signal and the energy adjuster 180 adjusts the noise energy to the energy of the HF envelope that is estimated in block 180 as well. This noise having an energy adjusted to the energy of the HF envelope (without any contributions from the LF envelope) is added by the adder 335 to the weighted pulse train as output by block 315. However, the order of the processing blocks or steps 315, 335, for example can also be changed.

On the other hand, the procedures regarding items 205 to 315 are only applied to the LF envelope as determined by block 160.

An embodiment relying on a decomposition of the full band envelope into at least two parts comprises the following blocks or steps in the below or in any other technically feasible order:

Temporal envelope estimation 100: Rectification; compression by using e.g. a function $x^{\wedge}0.75$; subsequent splitting 160 of the envelope in an LF envelope and an HF envelope. The LF envelope is obtained through lowpass filtering, where a crossover frequency is e.g. 2-6 kHz. In an embodiment, the HF envelope is the difference between the original envelope and an advantageously delay adjusted LF envelope.

Synchronized pulse placement 300. The LF envelope derived in the step described before is analyzed by e.g. a curve calculus, and a pulse placement is done on LF envelope maxima locations.

Individual pulse magnitude scaling 315 derived from envelope: The pulse train assembled in the step described before is weighted by temporal weights derived from the LF envelope.

The energy of the HF envelope is estimated, and random noise of the same energy is added 335 to the weighted pulse train.

Post processing, HF extraction or gap filling selection: The "raw" signal generated in the above described step at the output of block 335 is optionally post-processed 320, e.g. by noise addition, and is filtered 325 for use as HF in BWE or as a gap filing target tile signal.

Energy adjustment 330: The spectral energy distribution of the filtered signal from energy estimation as outlined in an above step is adjusted for use as HF in BWE or as a gap filing target tile signal. Here, side information from the bit stream on the desired energy distribution may be used.

Mixing 400 of HF or gap filling signal with LF: Finally, the adjusted signal from step 5 is mixed with the core coder output in accordance with usual BWE or gap filling principles, i.e. passing a HP filter and complementing the LF, or filling spectral holes in the gap filling spectral regions.

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

An inventively encoded audio signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The following references are incorporated hereby by reference:

[1] Dietz, M., Liljeryd, L., Kjörling, K., and Kunz, O., "Spectral Band Replication, a Novel Approach in Audio Coding," in Audio Engineering Society Convention 112, 2002.

[2] Disch, S., Niedermeier, A., Helmrich, C. R., Neukam, C., Schmidt, K., Geiger, R., Lecomte, J., Ghido, F., Nagel, F., and Edler, B., "Intelligent Gap Filling in Perceptual Transform Coding of Audio," in Audio Engineering Society Convention 141, 2016.

[3] Laitinen M-V., Disch S., Oates C., Pulkki V. "Phase derivative correction of bandwidth extended signals for perceptual audio codecs." In 140th Audio Engineering Society International Convention 2016, AES 2016. Audio Engineering Society. 2016.

[4] Atti, Venkatraman, Venkatesh Krishnan, Duminda A. Dewasurendra, Venkata Chebiyyam, Shaminda Subasingha, Daniel J. Sinder, Vivek Rajendran, Imre Varga, Jon Gibbs, Lei Miao, Volodya Grancharov and Harald Pobloth. "Super-wideband bandwidth extension for speech in the 3GPP EVS codec." 2015 IEEE International Conference on Acoustics, Speech and Signal Processing (ICASSP) (2015): 5927-5931.

The invention claimed is:

1. An audio processor for generating a frequency enhanced audio signal from a source audio signal, comprising:
an envelope determiner configured for determining a temporal envelope of at least a portion of the source audio signal;
an analyzer configured for analyzing the temporal envelope to determine temporal values of local maxima or local minima as certain features of the temporal envelope;
a signal synthesizer configured for generating a synthesis signal, the generating comprising placing pulses in relation to the temporal values of the certain features, wherein, in the synthesis signal, the pulses are weighted using weights derived from amplitudes of the temporal envelope related to the temporal values of the certain features, at which the pulses are placed; and
a combiner configured for combining at least a band of the synthesis signal that is not comprised in the source audio signal and the source audio signal to acquire the frequency enhanced audio signal.

2. The audio processor of claim 1, wherein the envelope determiner is configured
to decompose the source audio signal into a plurality of subband signals,
to calculate a selected temporal envelope of a selected subband signal of the plurality of subband signals, the selected temporal envelope being the temporal envelope, or
to calculate at least two temporal envelopes from at least two subband signals of the plurality of subband signals and to combine the at least two subband signals to acquire a combined temporal envelope as the temporal envelope.

3. The audio processor of claim 2,
wherein the envelope determiner is configured to normalize or filter the selected subband signals or the temporal envelopes before combining, or
wherein the combining comprises an averaging operation, or
wherein the envelope determiner is configured to calculate temporal envelopes from all subband signals of the plurality of subband signals, or
wherein the envelope determiner is configured to determine a single broadband temporal envelope of the source audio signal as the temporal envelope.

4. The audio processor of claim 1, wherein the envelope determiner is configured for determining the temporal envelope by
using an envelope follower configured for rectifying a waveform and low pass filtering the rectified waveform, or
calculating absolute values or powers of absolute values of a digital waveform and subsequently low pass filtering a result, or
using the calculation of an instantaneous root mean square value of the waveform through a sliding window with a defined window width, or
determining a piece-wise linear approximation of the waveform, wherein the temporal envelope is determined by finding and connecting peaks of the waveform in a sliding window moving through a result of the piece-wise linear approximation, or
using a Hilbert transform for generating an analytic signal for the waveform and calculating the envelope from the source audio signal and the analytic signal using squaring operations, adding operations and square root operations.

5. The audio processor of claim 1, wherein the analyzer is configured
to determine initial temporal values of the certain features, and
to derive, from the initial temporal values, the temporal values using an optimization function, or using side information associated with the source audio signal, or selecting or manipulating the temporal values in accordance with a processing rule.

6. The audio processor of claim 5, wherein the processing rule or the optimization function is implemented so that temporal values are placed in a raster with a raster spacing, wherein the raster spacing and a position of the raster within the temporal envelope is so that a deviation value between the temporal values and the initial temporal values comprises a predetermined characteristic.

7. The audio processor of claim 6, wherein the deviation value is a sum over squared differences and wherein the predetermined characteristic is a minimum characteristic.

8. The audio processor of claim 1, wherein the signal synthesizer is configured
to place only positive or only negative pulses to acquire a pulse train, and
to subsequently weight the pulses in the pulse train, or
to weight only negative or only positive pulses using the corresponding weightings associated with the temporal values of the pulses in a pulse train, and
to place the weighted pulses at the respective temporal values to acquire the pulse train.

9. The audio processor of claim 1,
wherein the signal synthesizer is configured to derive the weights from the amplitudes using a compression function, the compression function being a function from the group of functions comprising:
a power function with a power lower than 1, a log function, a square root function, and a non-linear function configured for reducing higher values and increasing lower values.

10. The audio processor of claim 1, wherein the signal synthesizer is configured to perform a post processing function, the post processing function comprising at least one of the group of functions comprising noise addition, addition of a missing harmonic, inverse filtering, and envelope adjustment.

11. The audio processor of claim 1,
wherein the envelope determiner is configured to decompose the temporal envelope into a low frequency portion and a high frequency portion,
wherein the analyzer is configured to use the low frequency portion of the temporal envelope for analyzing.

12. The audio processor of claim 11, wherein the signal synthesizer is configured to generate energy adjusted noise, and to add the energy adjusted noise to a signal comprising weighted or non-weighted pulses to acquire the synthesis signal.

13. The audio processor of claim 1,
wherein the signal synthesizer is configured to high pass filter or to bandpass filter a signal comprising the placed and weighted pulses to acquire at least the band of the synthesis signal that is not comprised in the source audio signal and to perform a spectral envelope adjustment with the band of the synthesis signal, or
wherein the spectral envelope adjustment is performed using envelope adjustment values derived from side information associated with the source audio signal or using envelope adjustment values derived from the source audio signal or in accordance with a predetermined envelope adjustment function.

14. The audio processor of claim 1, wherein the source audio signal is a time domain audio signal,
wherein the at least band of the synthesis signal is a time domain audio signal, and
wherein the combiner is configured to perform a time domain combination using a sample-by-sample addition of samples of the at least one band of the synthesis signal and corresponding samples of the source audio signal.

15. The audio processor of claim 1, wherein the source audio signal is an excitation signal in an LPC (LPC=Linear Prediction Coding) domain,
wherein the at least one band of the synthesis signal is an excitation signal in the LPC domain,
wherein the combiner is configured to combine the source audio signal and the at least one band by a sample-by-sample addition in the LPC domain,
wherein the combiner is configured to filter a result of the sample-by-sample addition using an LPC synthesis filter to acquire the frequency enhanced audio signal, and
wherein the LPC synthesis filter is controlled by LPC data associated with the source audio signal as side information, and wherein the LPC synthesis filter is additionally controlled by envelope information for the at least one band of the synthesis signal.

16. The audio processor of claim 1,
wherein the analyzer, the signal synthesizer and the combiner operate in a time domain or an LPC time domain.

17. The audio processor of claim 1, wherein the envelope determiner is configured to apply a spectral conversion to extract a plurality of bandpass signals for a sequence of frames,
wherein the signal synthesizer is configured to apply a spectral conversion, to extract the at least one band of the synthesis signal, and to perform an envelope adjustment to the at least one band, and
wherein the combiner is configured to combine in the spectral domain and to apply a conversion into a time domain to acquire the frequency-enhanced audio signal.

18. A method of generating a frequency enhanced audio signal from a source audio signal, comprising:
determining a temporal envelope of at least a portion of the source audio signal;
analyzing the temporal envelope to determine local maxima or local minima as temporal values of certain features of the temporal envelope;
placing pulses in relation to the temporal values of certain features in a synthesis signal, wherein, in the synthesis signal, the placed pulses are weighted using weights derived from amplitudes of the temporal envelope related to the temporal values of the certain features, at which the pulses are placed; and
combining at least a band of the synthesis signal that is not comprised in the source audio signal and the source audio signal to acquire the frequency enhanced audio signal.

19. A non-transitory digital storage medium having stored thereon a computer program for performing a method of generating a frequency enhanced audio signal from a source audio signal, comprising:
determining a temporal envelope of at least a portion of the source audio signal;
analyzing the temporal envelope to determine local maxima or local minima as temporal values of certain features of the temporal envelope;
placing pulses in relation to the temporal values of the certain features in a synthesis signal, wherein, in the synthesis signal, the placed pulses are weighted using weights derived from amplitudes of the temporal envelope related to the temporal values of the certain features, at which the pulses are placed; and
combining at least a band of the synthesis signal that is not comprised in the source audio signal and the source audio signal to acquire the frequency enhanced audio signal,
when said computer program is run by a computer.

* * * * *